(12) United States Patent
Honermann et al.

(10) Patent No.: US 12,226,032 B1
(45) Date of Patent: Feb. 18, 2025

(54) SLIDABLE ROD RACK SYSTEM

(71) Applicant: Quality Wood Designs Inc., Mitchell, SD (US)

(72) Inventors: Michael Honermann, Mitchell, SD (US); Victor Honermann, Mitchell, SD (US)

(73) Assignee: Quality Wood Designs Inc., Mitchell, SD (US)

( * ) Notice: Subject to any disclaimer, the term of this patent is extended or adjusted under 35 U.S.C. 154(b) by 0 days.

(21) Appl. No.: 18/539,793

(22) Filed: Dec. 14, 2023

Related U.S. Application Data (63) Continuation of application No. 16/178,535, filed on Nov. 1, 2018, now Pat. No. 11,882,948.

(60) Provisional application No. 62/580,081, filed on Nov. 1, 2017.

(51) Int. Cl.
| | |
|---|---|
| *A47F 7/00* | (2006.01) |
| *A47F 5/00* | (2006.01) |
| *A01K 97/10* | (2006.01) |
| *A47B 81/00* | (2006.01) |
| *A47F 5/08* | (2006.01) |

(52) U.S. Cl.
CPC .......... *A47F 7/0028* (2013.01); *A47F 5/0093* (2013.01); *A01K 97/10* (2013.01); *A47B 81/005* (2013.01); *A47F 5/08* (2013.01); *A47F 7/0021* (2013.01)

(58) Field of Classification Search
CPC .... A47F 7/0028; A47F 5/0093; A47F 7/0021; A47F 5/08; A01K 97/10; A01K 97/08; A47B 81/005
See application file for complete search history.

(56) References Cited

U.S. PATENT DOCUMENTS

| | | | | |
|---|---|---|---|---|
| 1,174,615 | A * | 3/1916 | Saine .................. | E01B 9/42 |
| | | | | 238/290 |
| 1,317,341 | A * | 9/1919 | Wild .................. | E01B 3/16 |
| | | | | 238/65 |
| 2,251,271 | A * | 8/1941 | Campo, Jr. ......... | A47B 81/005 |
| | | | | 211/64 |
| 2,511,361 | A * | 6/1950 | McQuaid ............ | E01B 5/08 |
| | | | | 238/143 |
| 2,660,506 | A * | 11/1953 | Wright ............... | A47B 53/00 |
| | | | | 211/41.12 |
| 4,585,127 | A * | 4/1986 | Benedict ............ | A47B 61/02 |
| | | | | 211/94.01 |
| 4,771,899 | A * | 9/1988 | Benedict ............ | A47B 61/02 |
| | | | | 211/94.01 |
| 4,826,013 | A * | 5/1989 | Heikkinen ......... | B65F 1/0046 |
| | | | | 206/520 |
| 4,871,074 | A * | 10/1989 | Bryson .............. | A45D 20/12 |
| | | | | 211/70.6 |
| D331,698 | S * | 12/1992 | Pezzoli ............... | D9/434 |

(Continued)

*Primary Examiner* — Devin K Barnett
(74) *Attorney, Agent, or Firm* — Westman, Champlin & Koehler P.A.

(57) ABSTRACT

In some embodiments, a device may include a triangular prism-shaped support and a slidable rack. The triangular prism-shaped support includes a u-shaped channel guide. The slidable rack is configured to slide back and forth along the u-shaped channel guide of the triangular prism-shaped support. The slidable rack includes a first arm assembly including a plurality of notches spaced along a length of the first arm assembly.

17 Claims, 9 Drawing Sheets

(56) References Cited

U.S. PATENT DOCUMENTS

| | | | | |
|---|---|---|---|---|
| 5,279,428 A * | 1/1994 | Lee | B65D 85/42 | |
| | | | 211/26 | |
| 5,657,883 A * | 8/1997 | Badia | A01K 97/10 | |
| | | | D6/552 | |
| D410,767 S * | 6/1999 | Carroll | D28/73 | |
| 5,908,120 A * | 6/1999 | Yates | B05B 5/082 | |
| | | | 118/500 | |
| D428,533 S * | 7/2000 | Carroll | D28/73 | |
| 6,227,387 B1 * | 5/2001 | Rose | A47J 47/16 | |
| | | | 211/113 | |
| 6,450,318 B1 * | 9/2002 | Minardi | B66C 11/06 | |
| | | | 414/940 | |
| 6,484,893 B1 * | 11/2002 | Tkatch | A47F 3/063 | |
| | | | 211/94.01 | |
| 7,478,892 B2 * | 1/2009 | Punzel | E05C 9/043 | |
| | | | 312/351 | |
| 7,731,310 B2 * | 6/2010 | Kohlmann | A47B 67/04 | |
| | | | 312/287 | |
| 9,022,237 B2 * | 5/2015 | Hall | A47B 81/04 | |
| | | | 211/162 | |
| D743,048 S * | 11/2015 | Kuran | D24/231 | |
| D776,956 S * | 1/2017 | Ma | D6/552 | |
| D819,266 S * | 5/2018 | Melamed | D28/18 | |
| 10,362,868 B2 * | 7/2019 | Haug | A47B 81/02 | |
| 11,172,760 B1 * | 11/2021 | Market | A47B 95/008 | |
| 2003/0071001 A1 * | 4/2003 | Goldberg | A47G 25/0692 | |
| | | | 211/105.3 | |
| 2004/0140462 A1 * | 7/2004 | Rowley | F24S 30/422 | |
| | | | 256/27 | |
| 2005/0236346 A1 * | 10/2005 | Whitney | B01L 9/06 | |
| | | | 211/74 | |
| 2006/0283820 A1 * | 12/2006 | Peters | A47B 81/005 | |
| | | | 211/64 | |
| 2009/0230205 A1 * | 9/2009 | Hepner | B61B 5/00 | |
| | | | 238/2 | |
| 2009/0288578 A1 * | 11/2009 | Hepner | B61B 13/04 | |
| | | | 105/141 | |
| 2010/0072338 A1 * | 3/2010 | Carnes | A01K 97/10 | |
| | | | 43/21.2 | |
| 2012/0152767 A1 * | 6/2012 | Harry | A47B 81/005 | |
| | | | 206/317 | |
| 2015/0217788 A1 * | 8/2015 | Camp | B61B 13/04 | |
| | | | 104/118 | |
| 2015/0375937 A1 * | 12/2015 | McIntosh | B65F 1/067 | |
| | | | 220/255 | |
| 2018/0160806 A1 * | 6/2018 | Honermann | A47B 88/407 | |
| 2020/0102161 A1 * | 4/2020 | Ragan | B60L 13/03 | |
| 2021/0323583 A1 * | 10/2021 | Zhu | B61B 13/04 | |

* cited by examiner

SLIDABLE ROD RACK SYSTEM

This application is a continuation of U.S. patent application Ser. No. 16/178,535 filed on Nov. 1, 2018, which is a non-provisional of and claims priority to U.S. Provisional Patent Application No. 62/580,081 filed on Nov. 1, 2017 and entitled "Slidable Rod Rack System;" these priority applications are incorporated herein by reference in their entirety.

FIELD

The present disclosure is generally related to a storage and display system for displaying fishing rods, and more particularly is directed to a slidable rod rack system.

BACKGROUND

Conventionally, devices, such as rifles, fishing rods, golf clubs, and the like, include a base portion and an elongate element including a handle. Retail stores often display such devices on shelves extending parallel to the aisle in which they are displayed. In some instances, special display stands may be provided to hold such devices.

SUMMARY

In some embodiments, a slidable rack system may include a mounting base configured to engage a support structure, such as a wall or shelving unit, and including a support member extending substantially perpendicular relative to the wall or shelving unit and configured to provide a guide for a slidable rack. The slidable rack system may further include the slidable rack configured to engage the guide of the mounting base. The slidable rack may be configured to extend away from and retract toward the wall or shelving unit. The slidable rack may include a substantially triangular base, a vertical support member coupled to the triangular base, a first support arm coupled to the vertical support member above the triangular base and including a plurality of holding elements, and a second support arm coupled to the vertical support member above the first support member.

In some embodiments, the first support arm may include a plurality of notches or semi-circular holding elements that open toward the triangular base. The second support arm may include a plurality of notices or semi-circular holding elements that open away from a center of the rack. Other embodiments are also possible.

In some embodiments, the substantially triangular base may be configured to contact an end of an item to be displayed. The end may be a handle, a club head, or another feature of the item. The base may apply a first force to the end of the item that is at an angle other than perpendicular with respect to gravity and away from a center of the rack. The notches or plurality of semi-circular openings in the first support arm may be configured to engage a second portion of the item and to apply a second force to the second portion that is at an angle that is substantially perpendicular with respect to gravity and toward the center of the rack. The notches or plurality of semi-circular openings in the second support arm may be configured to engage a third portion of the item and to apply a third force to the third portion that is at an angle that is substantially perpendicular with respect to gravity and away from the center of the rack. The first, second, and third forces may cooperate to secure the item in a substantially vertical orientation within the rack. The rack may be extended or retracted in order to view and access one or more items within the rack.

In other embodiments, a device may include including a mounting base configured to couple to a structure, a triangular prism-shaped support coupled to the mounting base, and a slidable rack configured to slide back and forth along the triangular prism-shaped support.

In still other embodiments, a device may include a slidable rack configured to secure a plurality of rods. The slidable rack may include a triangular base. The device may also include a triangular prism-shaped support configured to fit within the triangular base of the slidable rack and configured couple to a mounting base. The triangular prism-shaped support may include a first sliding mechanism, a second sliding mechanism, and a base coupled to the first and second sliding mechanisms. Other embodiments are also possible.

BRIEF DESCRIPTION OF THE DRAWINGS

In the following discussion, the same reference numbers are used in the various embodiments to indicate the same or similar elements.

DETAILED DESCRIPTION OF ILLUSTRATIVE EMBODIMENTS

Embodiments of a slidable rod rack system are disclosed below that may be configured to couple to a wall or a shelf structure and that be accessible by a user to extend and retract like a drawer. In some embodiments, the slidable rod rack system may include a substantially triangular base configured to engage a portion of a mounting base and to extend and retract relative to the mounting base. The slidable rod rack system may further include a vertical member extending substantially vertically relative to the triangular base and extending substantially parallel with the wall or the shelf structure.

The slidable rod rack system may further include a first arm extending from the vertical member and including a plurality of notches or holding elements configured to engage an item, such as a fishing rod. The slidable rod rack system may also include a second arm extending from the vertical member above the first arm and including a plurality of notches or holding elements configured to engage the item. The notches of the first and second arms and the slope provided by the triangular base may cooperate to secure the item within the rack. One possible example of a slidable rod rack system is described below with respect to FIG. 1.

Figure 1:
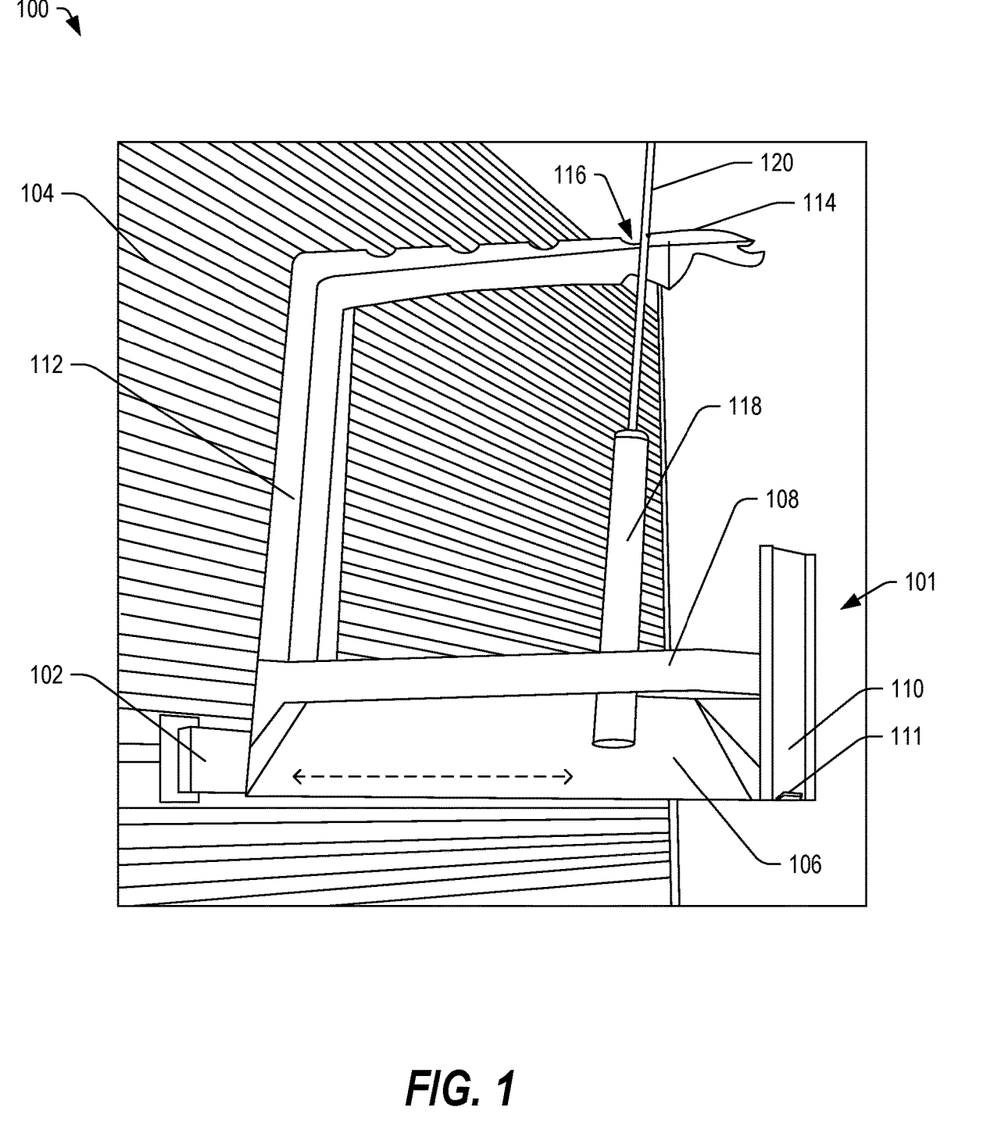
FIG. 1 depicts a portion of a slidable rod rack system including a supporting structure and a slidable rod rack, in accordance with certain embodiments of the present disclosure.

FIG. 1 depicts a perspective view 100 of a portion of a slidable rod rack system including a supporting structure and a slidable rod rack 101, in accordance with certain embodiments of the present disclosure. The slidable rod rack system may include a mounting base 102 configured to engage a support structure, such as a wall 104. The mounting base 102 may further include a guide member that may extend from the wall 104.

The slidable rack system may further include a slidable rack 101 including a substantially triangular base 106 configured to engage the guide member of the mounting base 102 at a first end and coupled to an end cap 110 at an opposite end. The end cap 110 may include a handle 111 accessible by a user to facilitate sliding of the slidable rack 101. The slidable rack 101 may further include a vertical member 112 coupled to the triangular base 106. The slidable rack 101 may also include a first arm assembly 108 coupled to the vertical member 112 and extending substantially parallel to and on both sides of an upper tip of the triangular base 106. The first arm assembly 108 may include a plurality of notches or openings (notches 202 in FIG. 2) that open toward the upper tip of the triangular base 106. The slidable rack 101 may further include a second arm assembly 114 that is coupled to the vertical member 112 and positioned over the triangular base 106. The second arm assembly 114 includes a plurality of notches 116 along outer edges of the second arm assembly 114.

In the illustrated example, the slidable rack 101 is holding a fishing rod 120. In particular, an end of a handle 118 of the fishing rod 120 rests against a sloped surface of the triangular base 106, and a portion of the handle 118 rests against a notch of the first arm assembly 108. The rod 120 rest against a notch 116 of the second arm assembly 114. The sloped side of the triangular base 106, the notch of the first arm assembly 108 and the notch 116 of the second arm assembly 114 cooperate to secure the fishing rod 120 and its handle 118 in the slidable rack 101. In particular, the force of gravity cases the end of the handle 118 to rest against the sloped surface of the triangular base 106 and to tilt the handle 118 toward the notch of the first arm assembly 108, which applies a first horizontal force in a first direction toward the tip of the triangular base 106. The notch 116 applies a second horizontal force in a second direction opposite to the first direction. The opposing forces cooperate to secure the fishing rod 120 in the slidable rack 101.

It should be understood that the fishing rod 120 represents one possible item that can be secured within the slidable rack 101. The slidable rack 101 may be configured to secure other items as well, such as rifles, golf clubs, umbrellas, other elongate items, or any combination thereof.

In the illustrated example, the triangular base 106 may include rollers or another feature configured to engage a guide of the support member 102 to enable the slidable rack 101 to slide away from the wall 104 and toward the wall 102 as desired. It should be appreciated that, while only one slidable rack 101 is shown, multiple slidable rack assemblies may be coupled to the wall 104 to provide a plurality of slidable racks 101.

Figure 2:
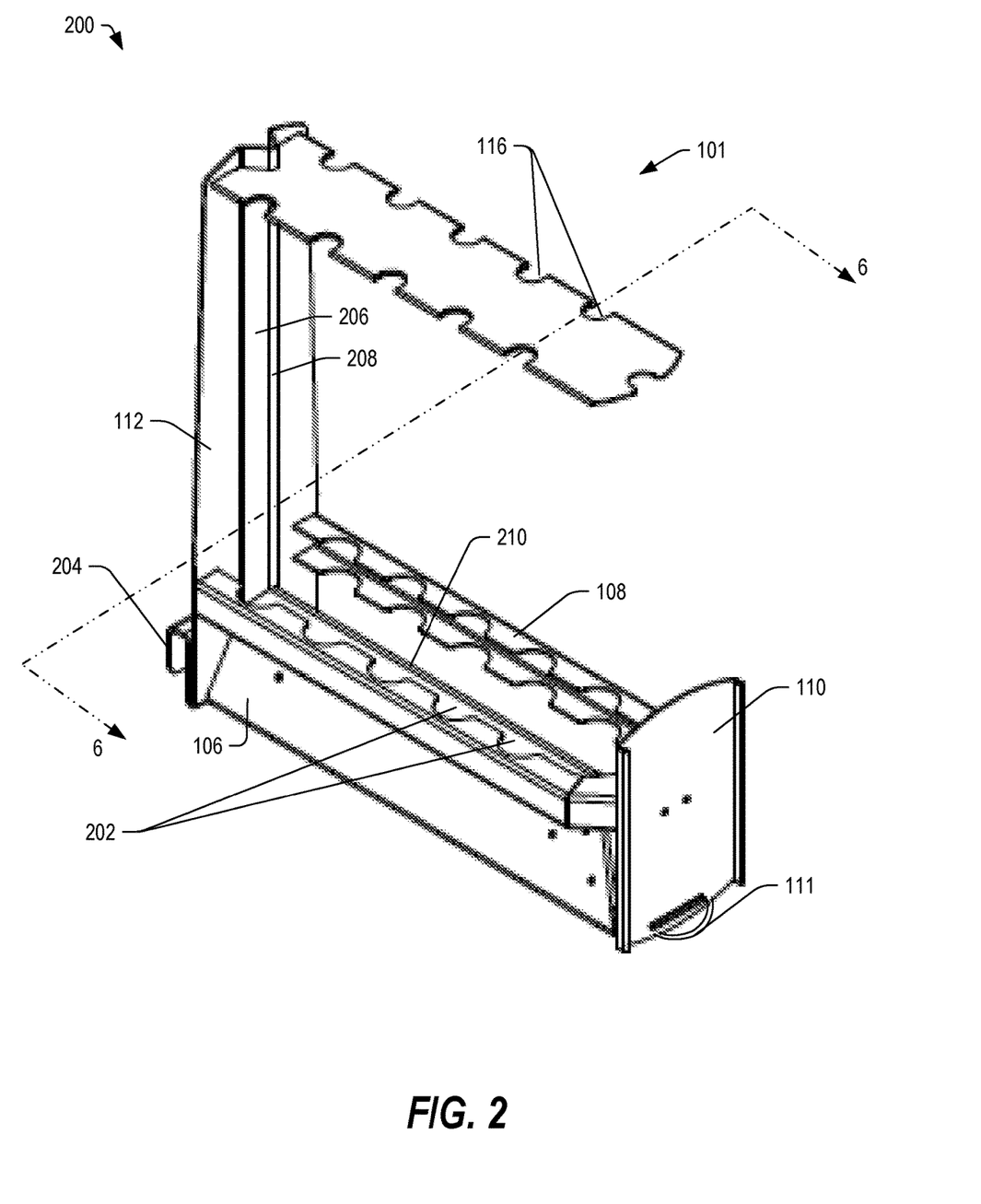
FIG. 2 depicts a top perspective view of the slidable rod rack of FIG. 1, in accordance with certain embodiments of the present disclosure.

FIG. 2 depicts a top perspective view 200 of the slidable rod rack 101 of FIG. 1, in accordance with certain embodiments of the present disclosure. In the illustrated example, the slidable rack 101 may include all of the elements of the slidable rack 101 of FIG. 1. Further, in this example, the mounting base 102 may include a hook 204 configured to engage slots or features of the wall 104 to secure the slidable rack 101 to the wall 104.

In the illustrated example, the first arm assembly 108 includes u-channel structures extending along either side of a tip 210 of the triangular base 106. Each of the u-channel structures may include a plurality of notches 202 that are open toward the tip 210. Further, the second arm assembly 114 may include a plurality of notches 116 on outer edges of the second arm assembly.

In the illustrated example, the vertical member 112 may include a V-shaped bend extending vertically along its length. The V-shaped bend may include a sloped portion 206 on either side of a tip 208. The v-shaped bend may add rigidity and holding strength for the vertical member 112.

Figure 3A:
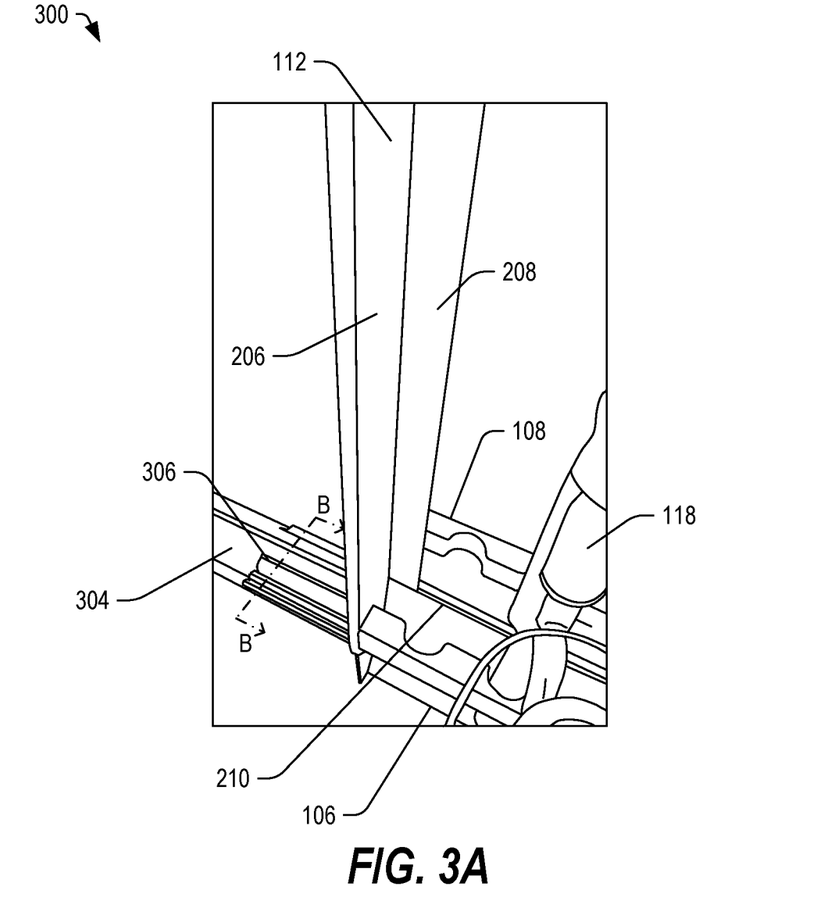
FIG. 3A depicts a perspective view of a slidable rod rack, in accordance with certain embodiments of the present disclosure.

FIG. 3A depicts a perspective view of a portion of a slidable rod rack 300, in accordance with certain embodiments of the present disclosure. The slidable rod rack 300 may be an embodiment of the slidable rod racks of FIGS. 1-2. The vertical member 112 may include the sloped portion 206 and a tip 208, as shown in FIG. 2.

Further, the slidable rod rack 300 includes the tip 210 of the triangular base 106. Further, the slidable rod rack 300 is depicted in a partially extended state, exposing the triangular prism-shaped support 304 and associated slide mechanisms 306 on either side of the support 304. It should be appreciated that the triangular prism-shaped support 304 may have a substantially triangular prism shape, and the slide mechanisms 306 may be tilted in parallel with the angled surfaces.

It should be appreciated that, in one embodiment, the slide mechanisms 306 may be implemented in a variety of ways, including ball bearing side mount drawer slides, bottom-mount slides, and so on. In a particular example, the side mount drawer slides may be tilted toward one another along an upper edge and attached together to form the point of the triangular-shaped prism and the bottom edges may be coupled to a base plate to complete the triangular-shaped prism. The slide mechanisms 306 may thus be arranged to form the triangular prism-shaped support 302 and to engage corresponding elements along an interior surface of the triangular base 106.

In a particular embodiment, the triangular prism-shaped support 304 may be formed from the guide of the slide mechanisms 306. The guide of the slide mechanism 306 may be formed from a u-shaped or u-channel structure, and the sliding portion of the sliding mechanism 306 may slide within the u-shaped or u-channel guide structure. One end of the u-shaped or u-channel guide structure may be welded or otherwise attached to a base, which may couple the slidable rod rack to a wall. The other end of the u-shaped or u-channel guide may be open or may have an end cap and may extend into an enclosure formed by the triangular base 106. An upper edge of the u-shaped or u-channel guide may be connected or attached to the upper edge of the other u-shaped or u-channel guide. One possible example is described below with respect to FIG. 3B.

Figure 3B:
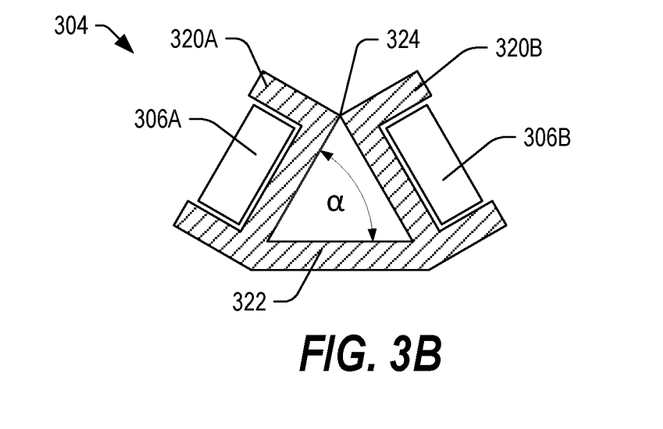
FIG. 3B depicts a cross-sectional view of triangular prism-shaped support taken along line B-B in FIG. 3A.

FIG. 3B depicts a cross-sectional view of triangular prism-shaped support 304 taken along line B-B in FIG. 3A. The triangular prism-shaped support 304 may include a first u-shaped or u-channel guide 320A tilted at an angle α relative to a horizontal base 322. The triangular prism-shaped support 304 may also include a second u-shaped or u-channel guide 320B tilted at an angle α toward the first u-shaped or u-channel guide 320A. The upper edges of the first and second u-shaped or u-channel guides 320A and 320B may be attached or otherwise connected at a joint 324. The opposite edges of the first and second u-shaped or u-channel guides 320A and 320B may be attached or otherwise connected to the base 322 to form a triangular prism-shaped support 304.

It should be appreciated that the depth of the u-shape or u-channel guide 320A and 320B is exaggerated for ease of understanding. It should be appreciated that this configuration of the sliding mechanisms 306 can reduce the dimensions of the underlying support 302 while reinforcing the strength of the structure of the underlying support 302, making it resistant to bending. Further, the triangular prism shape enables the underlying support 302 to support more weight than if the sliding mechanisms 306 were arranged in their conventional horizontal and vertical arrangement. By tilting one longitudinal edge toward the corresponding edge of the other sliding mechanism, the triangular shape is formed and the structure is reinforced. By coupling the guides 320A and 320B at the joint 324 and to the base 322, the resulting structure provides significant resistance to bending and shear stresses, providing improved strength. Additionally, the size of the triangular prism-shaped support 304 can be smaller than conventional slider supports. Further, the amount of material used to form the support 304 may be less than a conventional support. Thus, the triangular prism-based support 304 may represent an improvement in terms of strength, size, and manufacturing costs.

Figure 4:
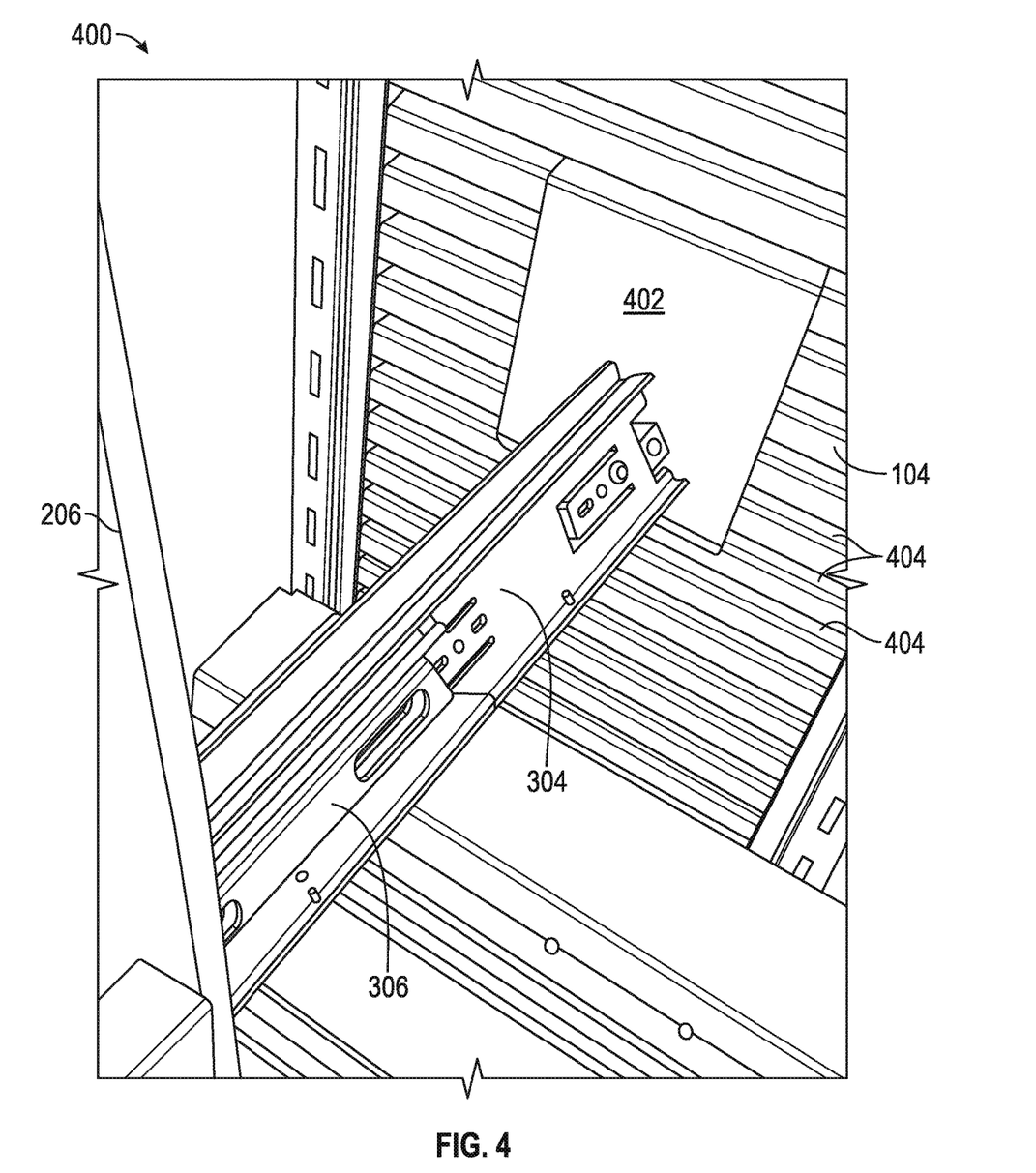
FIG. 4 depicts a top perspective view of a sliding mechanism and triangular prism-shaped support that can be used with the slidable rod racks of FIGS. 1-3, in accordance with certain embodiments of the present disclosure.

FIG. 4 depicts a top perspective view 400 of a sliding mechanism 306 and triangular prism-shaped support 304 that can be used with the slidable rod racks of FIGS. 1-3, in accordance with certain embodiments of the present disclosure. In this example, the triangular prism-shaped support 304 may be coupled to a base 402, which may include a coupling element (such as a z-shaped clip, a hook, or another coupling feature) configured to engage slots 404 in the wall 104. In this example, the u-shaped or u-channel guide 320 of the triangular prism-shaped support 304 can be seen, particularly against the base 402.

Figure 5:
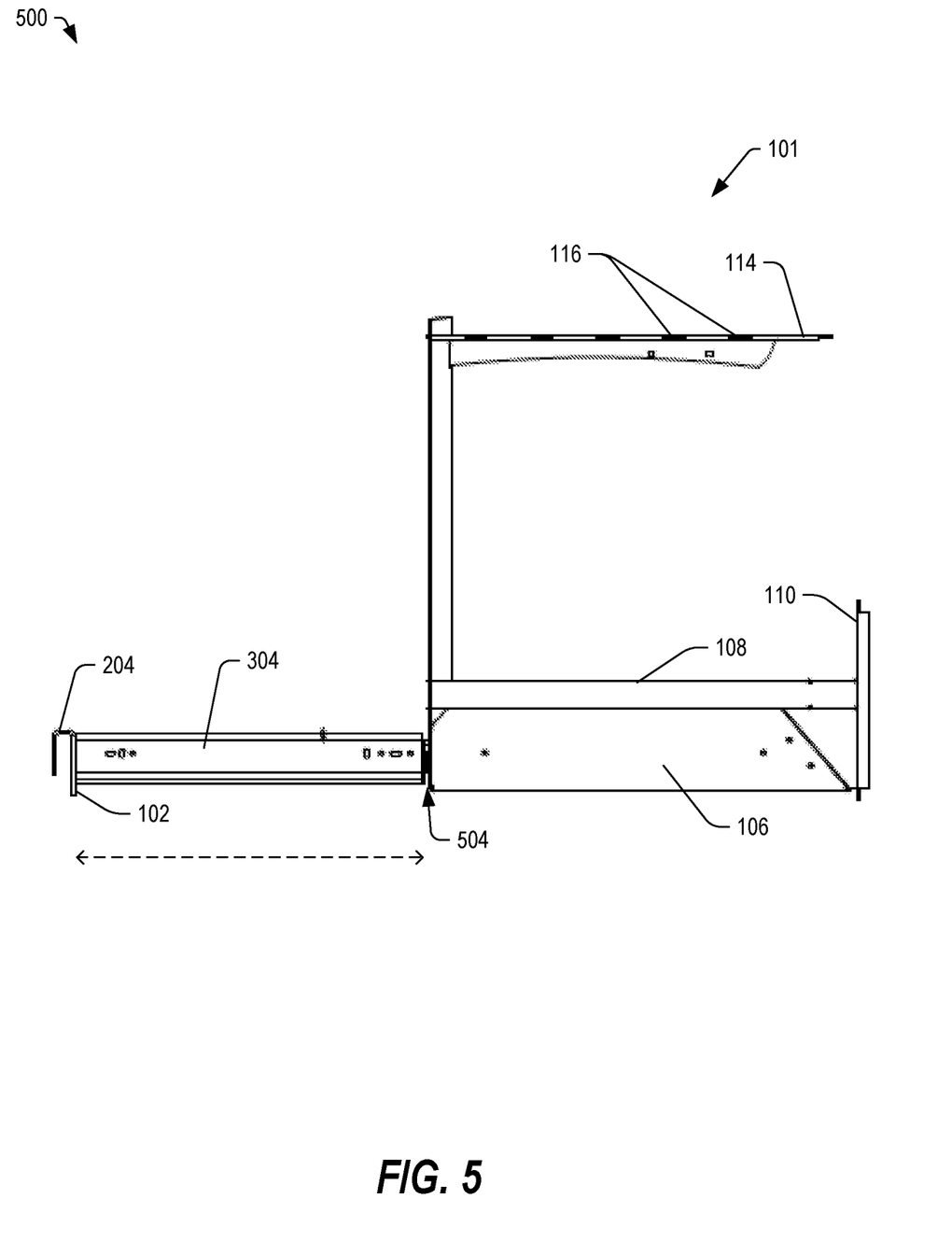
FIG. 5 depicts a side view of the slidable rod rack of FIGS. 1-3, in accordance with certain embodiments of the present disclosure.

FIG. 5 depicts a side view 500 of the slidable rod rack 101 of FIG. 2, in accordance with certain embodiments of the present disclosure. In this example, the mounting base 102 includes the hook 204 and includes a guide 502 that extends substantially perpendicular relative to the wall 104. The triangular base 106 may include a sliding element 504 configured to engage the guide 320 to allow the slidable rack 101 to extend and retract relative to the wall 104.

The slidable rod rack 101 may extend and retract like a drawer (as depicted by the arrow) to allow a user to access any of the items held in the rack 101. Further, multiple slidable rod racks 101 may be attached to the wall 104, side-by-side, to allow access to the items. Other embodiments are also possible.

In this example, the hook 204 may operate to engage a slot on the surface of the wall 104. The hook 204 may slide into the slot and a top portion of the hook 204 may rest on the top of the slot. Further, the weight of the slidable rack 101 may tilt toward the wall 104 such that a portion of the mounting base 102 may rest against a surface of the wall 104.

Figure 6:
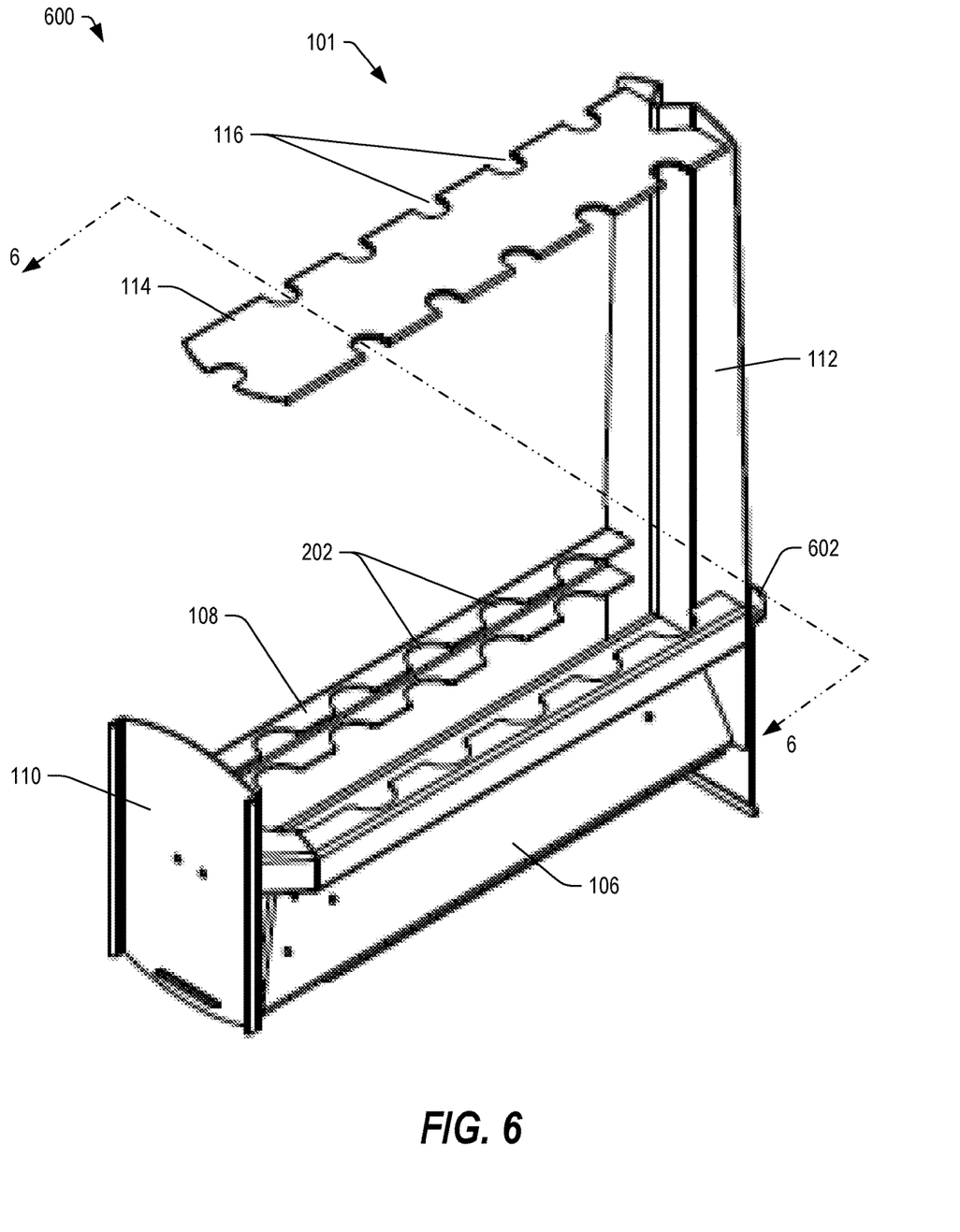
FIG. 6 depicts a top perspective view of a slidable rod rack, in accordance with certain embodiments of the present disclosure.

FIG. 6 depicts a top perspective view 600 of a slidable rod rack 101, in accordance with certain embodiments of the present disclosure. In this example, the slidable rod rack 101 includes all of the elements of the slidable rod rack 101 of FIGS. 1-5, except that the hook 204 may be omitted. In this example, instead of the hook 204, the mounting base 102 may include or be coupled to a z-clip 602, which may be configured to engage first and second slots in a wall 104. In some embodiments, the z-clip 602 may be an embodiment of the base 402 in FIG. 4.

Figure 7:
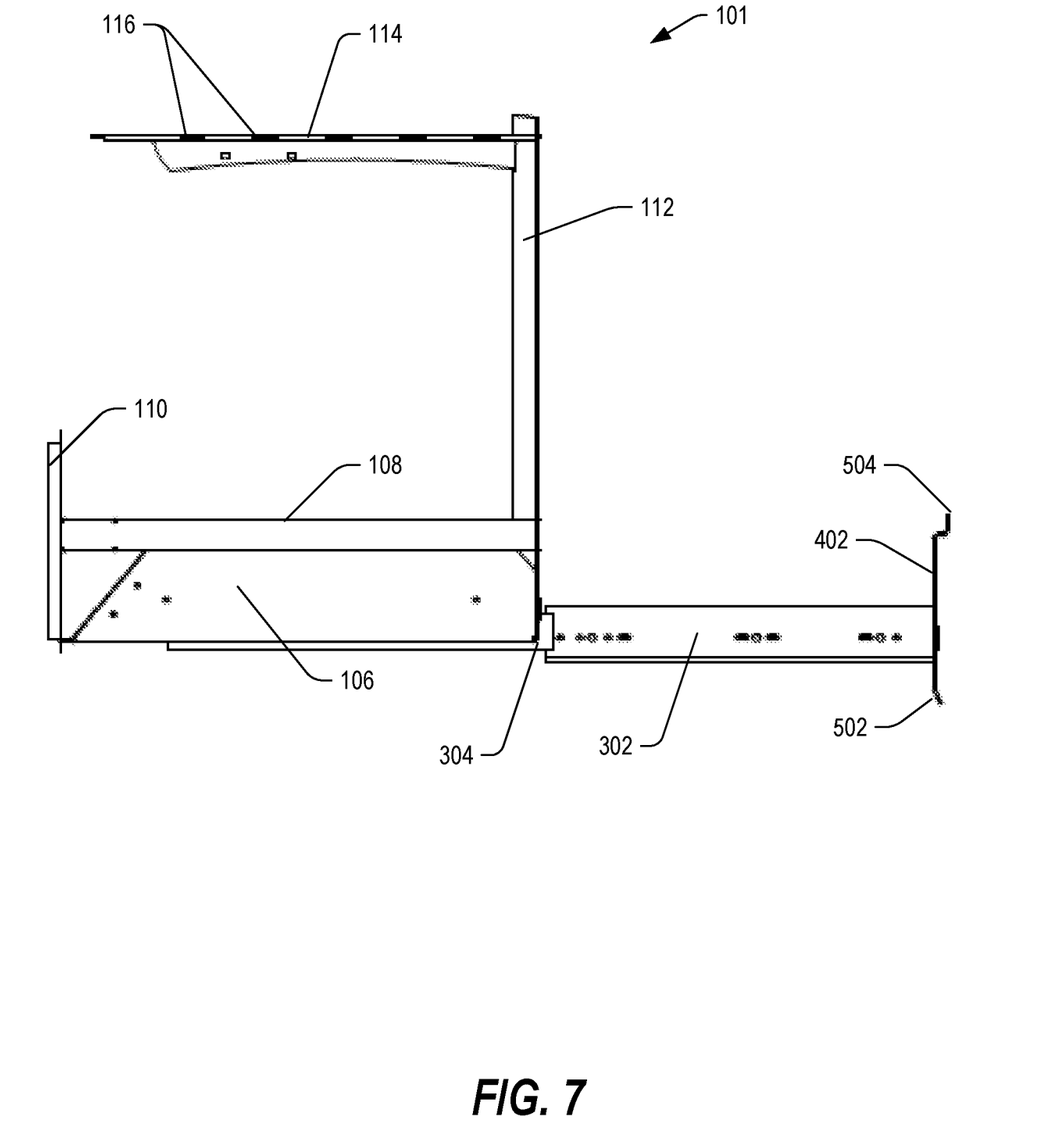
FIG. 7 depicts a side view of the slidable rod rack of FIG. 6, in accordance with certain embodiments of the present disclosure.

FIG. 7 depicts a side view 700 of the slidable rod rack 101 of FIG. 6, in accordance with certain embodiments of the present disclosure. In this example, the z-clip 602 includes a lower portion 702 configured to engage a first slot on the wall 104, and includes an upper portion 704 configured to engage a second slot on the wall 104. Other embodiments are also possible.

Figure 8:
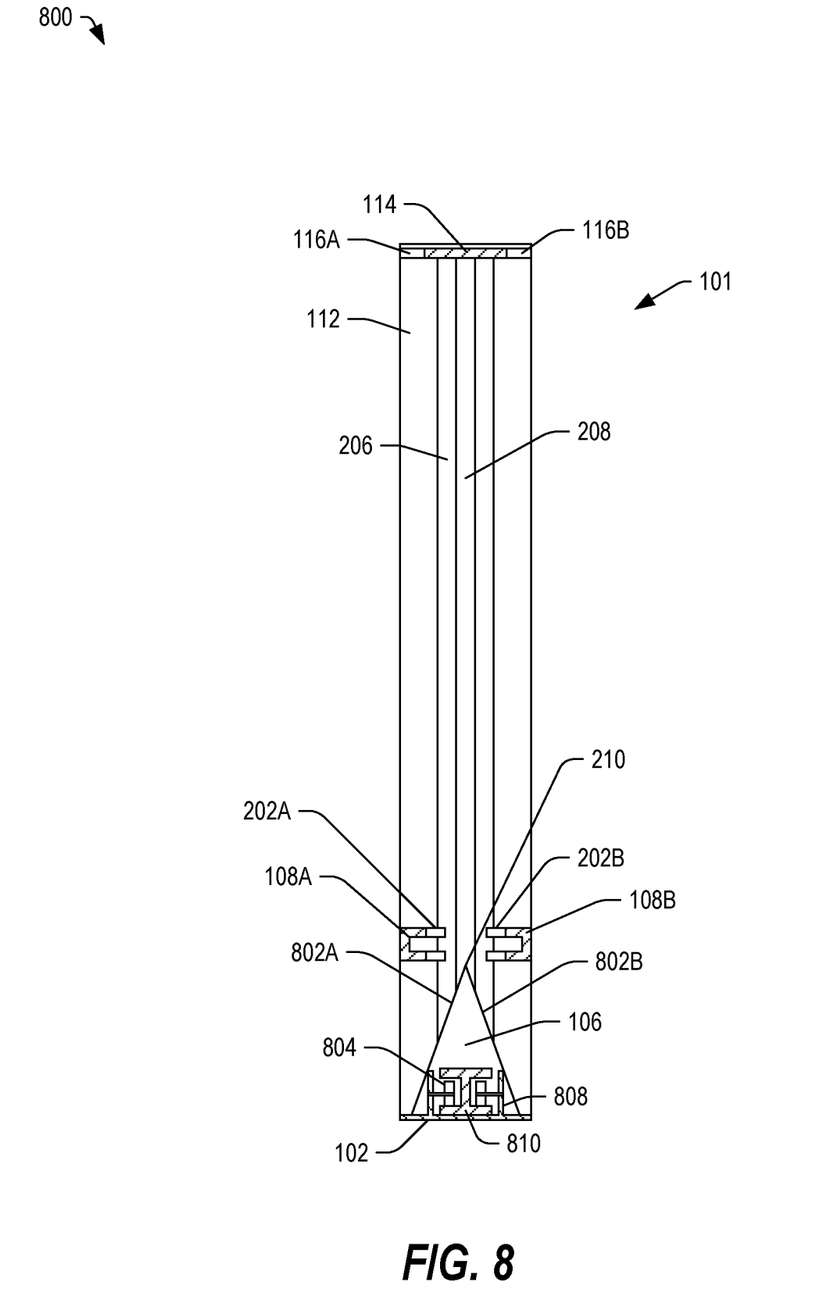
FIG. 8 depicts a cross-sectional view of one possible embodiment of the slidable rod racks of FIGS. 1-7 taken along line 6-6 in FIGS. 2 and 6, in accordance with certain embodiments of the present disclosure.

FIG. 8 depicts a cross-sectional view 800 of the slidable rod rack 101 of FIGS. 1-7 taken along line 6-6 in FIGS. 2 and 6, in accordance with certain embodiments of the present disclosure. In this example, the triangular base 106 provides a first sloped surface 802A and a second sloped surface 802B. The first arm assembly 108 includes a first arm 108A and a second arm 108B on opposing sides of the tip 210 of the triangular base 106. The first arm 108A includes first notches 202A that open toward a central axis of the slidable rack 101 that extends from the tip 210 and parallel to a length of the vertical member 112. The second arm 108B includes second notches 202B that open toward the central axis. The first arm assembly 108 may be positioned adjacent to the tip 210 of the triangular base 106.

The slidable rod rack 101 may include a second arm assembly 114, which may be positioned above the triangular base 106 and toward a distal end of the vertical member 112. The second arm assembly 114 may include a plurality of notches 116A and 116B, which may extend away from the central axis.

A guide 810 is shown in cross-section and has a substantially I-beam shape. This I-beam shaped guide 810 represents a different embodiment of the guide as compared to the triangular prism-shaped support 304 in FIGS. 3A and 3B. The sliding element 808 may include a sliding feature 804 configured to engage the I-beam shape of the guide 810 to enable the substantially triangular base 106 to extend away from and retract toward the wall 104. The sliding feature 804 may include bearings, wheels, or other components configured to facilitate extension and retraction of the sliding rod rack 101.

In some embodiments, the sloped surfaces 802A and 802B may push an end of a handle of an item (such as a golf club, a rifle, a fishing rod, and so on) away from the central axis. The first arm assembly 108 may push the handle 118 of the item toward the central axis. The second arm assembly 114 may push a distal end of the item (such as a fishing rod) away from the central axis. The applied-forces cooperate to hold the item in the slidable rack 101. Other embodiments are also possible.

Figure 9:
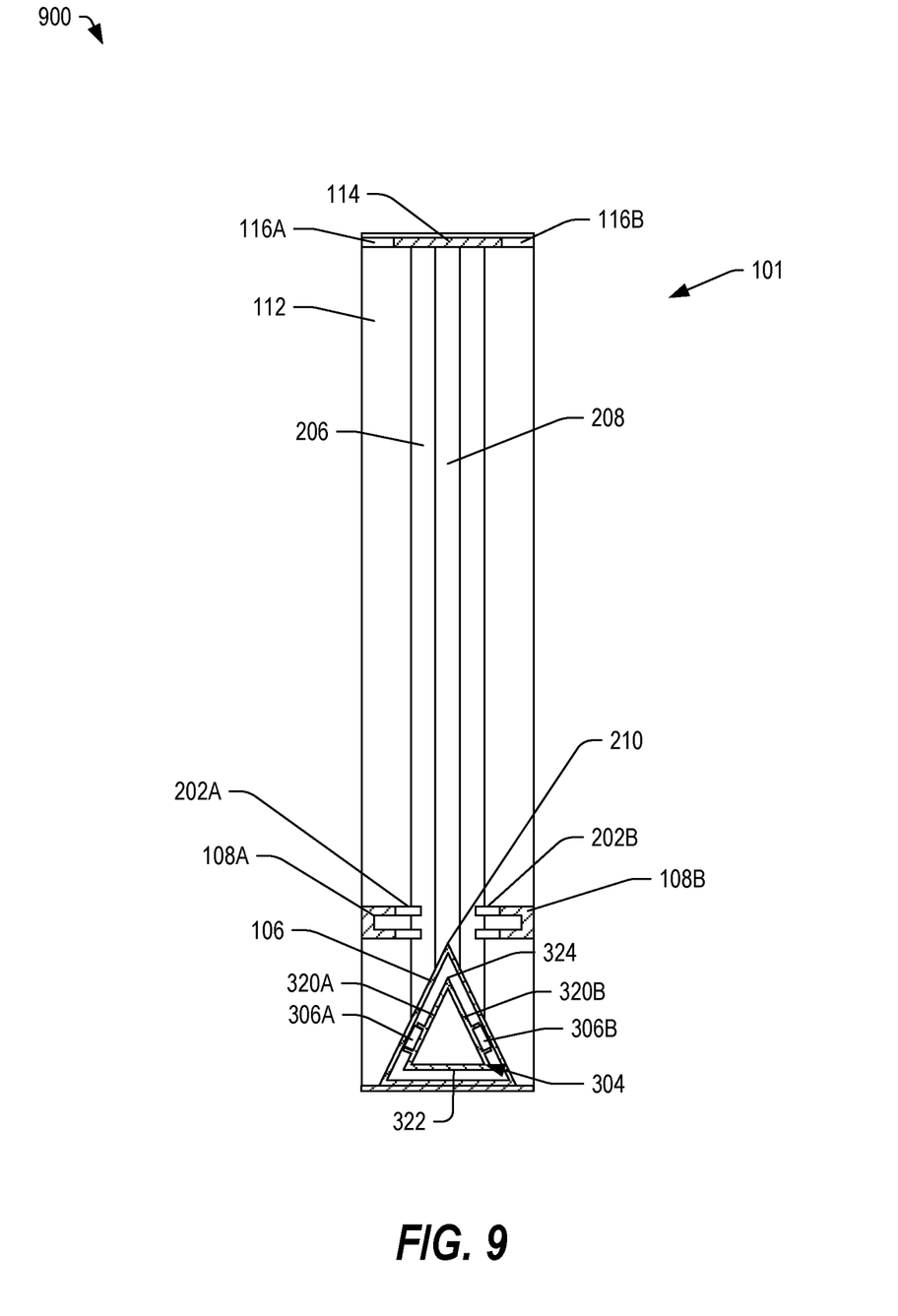
FIG. 9 depicts a cross-sectional view of one possible embodiment of the slidable rod rack of FIGS. 1-7 taken along line 6-6 in FIGS. 2 and 6, in accordance with certain embodiments of the present disclosure.

FIG. 9 depicts a cross-sectional view 900 of one possible embodiment of the slidable rod rack 101 of FIGS. 1-7 taken along line 6-6 in FIGS. 2 and 6, in accordance with certain embodiments of the present disclosure. The view 900 may include all of the elements of any of the embodiments of FIGS. 1-7.

In this example, the cross-sectional view 900 depicts the triangular prism-shaped support 304 including a first guide 320A, a second guide 320B, and a base 322 configured to form a triangular-prism. The first guide 320A and the second guide 320B may be configured to engage a first slide mechanism 306A and a second slide mechanism 306B, respectively. The first and second slide mechanisms 306A and 306B may be configured to engage the triangular base 106 to enable the triangular base 106 to move back and for the along the first and second guides 320A and 320B.

In some embodiments, an additional guide and associated sliding mechanism may be included between the triangular base 106 and the base 322 of the triangular prism-shaped support 304. Further, while the triangular base 106 is depicted as having a pointed tip 210, the tip 210 may be rounded or beveled. Other embodiments are also possible.

In conjunction FIGS. 1-9 and their associated descriptions, embodiments of the slidable rod rack system may include a mounting base with a guide and slidable rack configured to movably engage the guide to allow the rack to extend and retract. Other embodiments are also possible.

In some embodiments, the slidable rack may include a substantially triangular base providing a sloped surface configured to engage an end of an item. The slidable rack may also include a vertical member extending from the triangular base. The slidable rack may further include a first arm assembly including a plurality of notches that open toward a center axis extending through a tip of the triangular base and parallel to the vertical member. The plurality of notches of the first arm assembly may be configured to engage a portion of the item and to apply a horizontal force to the item directed toward the center axis. The slidable rack may also include a second arm assembly coupled to a distal end of the vertical member and including a plurality of notches configured to open in a direction away from the center axis. The plurality of notches of the first and second arms and the sloped surfaces of the triangular base may cooperate with gravitational forces to secure the item in the slidable rack.

Additionally, in some embodiments, the triangular base of the slidable rod rack may be configured to engage a triangular prism-shaped support formed of a pair of sliding mechanisms, each including a guide portion and a slider portion. The support may also include a base configured to couple to the pair of sliding mechanisms along their bottom edges. In some embodiments, each of the sliding mechanisms may form an angle relative to the base that is not perpendicular to the base. In an embodiment, the sliding mechanisms may be tilted toward one another, forming opposing acute angles relative to the base. The sliding mechanisms may be coupled to one another along a top edge, forming a triangle with the base. Other embodiments are also possible.

Although the present invention has been described with reference to preferred embodiments, workers skilled in the art will recognize that changes may be made in form and detail without departing from the scope of the invention.

What is claimed is:

1. A device comprising:
a triangular prism-shaped support; and
a slidable rack configured to slide back and forth along the triangular prism-shaped support, wherein the slidable rack comprises:
a mounting base;
an endcap attached to the mounting base; and
a first arm assembly fixed to the endcap, the first arm assembly comprising a plurality of first notches spaced along a length of the first arm assembly, and wherein the length is fixed in a direction parallel to a sliding direction of the slidable rack along the triangular prism-shaped support.

2. The device of claim 1, wherein the mounting base comprises at least one of a hook or a z-clip.

3. The device of claim 1, wherein the mounting base is a triangular base having first and second sloped surfaces.

4. The device of claim 3, wherein the triangular base is disposed between the triangular prism-shaped support and the first arm assembly.

5. The device of claim 3, wherein the triangular base comprises a beveled tip.

6. The device of claim 3, wherein the slidable rack comprises a vertical member that connects the triangular base and the first arm assembly.

7. The device of claim 6, wherein the slidable rack comprises a second arm assembly connected to the vertical member.

8. The device of claim 7, wherein the second arm assembly comprises a plurality of second notches spaced along a length of the second arm assembly.

9. The device of claim 8, wherein the plurality of first notches face one direction and the plurality of second notches face an opposite direction.

10. The device of claim 6, wherein the vertical member comprises a V-shaped bend.

11. The device of claim 1, wherein the triangular prism-shaped support comprises a first inclined u-shaped channel guide.

12. The device of claim 11, comprising a wheel configured to engage the first inclined u-shaped channel guide.

13. The device of claim 1, wherein the first arm assembly comprises a u-channel structure.

14. The device of claim 11, wherein the triangular prism-shaped support comprises a second inclined u-shaped channel guide.

15. The device of claim 14, wherein a bottom of each of the first and second inclined u-shaped channel guides is attached to a base of the triangular prism-shaped support.

16. The device of claim 14, wherein a top of the first inclined u-shaped channel guides is attached to a top of the second inclined u-shaped channel guide at a joint.

17. The device of claim 16, wherein a channel of each of the first and second u-shaped channel guides faces outward from the joint.

* * * * *